United States Patent
Gersemsky et al.

(10) Patent No.: US 7,295,619 B2
(45) Date of Patent: Nov. 13, 2007

(54) INTERFACE FOR DATA TRANSMISSION

(75) Inventors: Frank Gersemsky, Bochum (DE); Rüdiger Lorenz, Dinslaken (DE)

(73) Assignee: Infineon Technologies AG, Munich (DE)

( * ) Notice: Subject to any disclaimer, the term of this patent is extended or adjusted under 35 U.S.C. 154(b) by 748 days.

(21) Appl. No.: 10/734,441

(22) Filed: Dec. 12, 2003

(65) Prior Publication Data
US 2004/0141563 A1 Jul. 22, 2004

Related U.S. Application Data

(63) Continuation of application No. PCT/DE02/02064, filed on Jun. 6, 2002.

(30) Foreign Application Priority Data
Jun. 26, 2001 (DE) ................. 101 30 797

(51) Int. Cl.
*H04L 27/00* (2006.01)
(52) U.S. Cl. ................. 375/259
(58) Field of Classification Search ........ 375/259, 375/319, 219, 225; 710/47, 52; 709/200
See application file for complete search history.

(56) References Cited

U.S. PATENT DOCUMENTS

| 4,727,370 | A | 2/1988 | Shih | 340/825.1 |
| 5,280,584 | A | 1/1994 | Caesar et al. | 395/250 |
| 6,772,245 | B1* | 8/2004 | Pomerantz et al. | 710/60 |
| 2002/0065991 | A1* | 5/2002 | Fortuna et al. | 711/141 |

OTHER PUBLICATIONS

"Sony Playstation Controller Infromation"; Andrew J. McCubbin, (Online) Aug. 13, 1998, XP002216826 (Internet): <URL: http://www.gamesx.com/controldata/psxcont/psxcont.htm>; pp. 1-2, Aug. 13, 1998.

"Burst Fastloader for C64" by Pasi Ojala, (Online), XP002216827, (Internet): <URL: http//www.cs.tut.fi (albert/Dev/burst/>, p. 1, Jan. 8, 2000.

"RS232 Serial Port Solutions"; W.A. Steer [http://www.ucl.ac.uk/-ucapwas/rs232 htm] rech, Jan. 29, 2002.

* cited by examiner

*Primary Examiner*—Khai Tran
(74) *Attorney, Agent, or Firm*—Dicke, Billig & Czaja, PLLC

(57) ABSTRACT

A system for production and/or processing of data bursts has at least two series-connected modules, with data (Data) and information (Enable) relating to the validity of the data (Data) being transmitted from a first module (A) to an adjacent second module (B), and information (Read) relating to the reception of valid data being transmitted from the second module (B) to the first module (A).

15 Claims, 3 Drawing Sheets

INTERFACE FOR DATA TRANSMISSION

CROSS-REFERENCE TO RELATED APPLICATION

This application is a continuation of copending International Application No. PCT/DE02/02064 filed Jun. 6, 2002 which designates the United States, and claims priority to German application DE 10130797.7 filed on Jun. 26, 2001.

TECHNICAL FIELD OF THE INVENTION

The invention relates in general to systems for production and/or processing of data bursts. The data bursts are in this case produced and/or processed in two or more modules. In particular, the invention relates to an interface between two adjacent modules, via which data and information are interchanged.

BACKGROUND OF THE INVENTION

A system such as this on the one hand allows data bursts to be produced which are then transmitted without the use of wires to a receiver, and on the other hand allows data bursts that have already been received without the use of wires to be processed. For this purpose, the system has modules, and it is possible to interchange data between adjacent modules. Each of the modules carries out a different task. For example, the modules can be used for scrambling or descrambling of data or for production of a CRC monitoring bit pattern (Cyclic Redundancy Check) at the end of a data packet.

Previous systems of the type described above either have a completely hard-wired structure or contain both software-controlled modules and hard-wired modules which are used for time-consuming processing steps, for example a scrambler. A pure hardware solution has the disadvantage that the configuration options of the individual modules are restricted and that there is a lack of flexibility for joining the modules together by hard wiring between the modules. The disadvantage of a solution that comprises software and hardware modules is that the data processing rate of the system is limited by the data processing rate of the processor which assigns the data to the individual modules and then outputs the data again from these modules.

SUMMARY OF THE INVENTION

The object of the invention is thus to provide a system for production and/or processing of data bursts having at least two series-connected modules, which system has both a high lack of flexibility for joining the modules together, and has a high data processing rate. One particular aim of the invention is to specify an interface between two adjacent modules in the system, which prevents any possible loss of data during data transmission between the two modules.

The objective on which the invention is based can be achieved by a method for transmission of transmission or received data between two adjacent, series-connected modules in a transmission/reception path of a device for production and processing of data bursts, which is contained in a device for transmission and reception of data without the use of wires, the method comprising the steps of:

when transmission data is being transmitted without the use of wires, the two modules are a part of the transmission path, and transmission data is transmitted from a first of the two modules to a second of the two modules, information relating to the validity of the transmission data is transmitted from the first module to the second module, and information relating to the reception of valid transmission data is transmitted from the second module to the first module, and when received data is received without the use of wires, the two modules are a part of the reception path, and received data is transmitted from the second module to the first module, information relating to the validity of the received data is transmitted from the second module to the first module, and information relating to the reception of valid received data is transmitted from the first module to the second module.

Information relating to the completion of a data transmission, in particular relating to the completion of the transmission of a data packet, can be transmitted from the first module to the second module during transmission, and can be transmitted from the second module to the first module during reception. The first module and the second module can be connected to one another by means of hard wiring, in which connections for data and information transmission between the first module and the second module are defined by software which, for this purpose, in particular sets registers. A clock transmitter unit can produce a clock signal which, in particular, is at a clock rate of 26 MHz. The transmission of data and/or information may start and end with a clock signal from the clock transmitter unit. The clock signal can be a binary square-wave signal. The transmission of data and/or information may start and end with a change in the binary square-wave signal from a bit0 state to a bit1 state, or from a bit1 state to a bit0 state. The data may comprise bit strings. The information relating to the validity of the data and/or the information relating to the reception of valid data and/or the information relating to the completion of a data transmission may have binary states. During the transmission of valid data, the information relating to the validity of the data can be transmitted in a bit1 state or in a bit0 state. When one of the modules receives data and when the module receives information relating to the validity of the data in a high state, a pulse can be transmitted in a bit1 state or in a bit0 state as information relating to the reception of valid data from the module. After the completion of the transmission of data by one of the modules and after the valid reception of the data by the respective module other than the transmitting module, the information relating to the completion of a data transmission can be sent in a bit1 state or in a bit0 state. The at least two series-connected modules can be selected from the totality of a list of modules which comprises the following modules:

a module for access to a memory unit,
a module with a CVSD coder and/or CVSD decoder,
a module with an ADPCM unit,
a module with a CRC generator and/or a CRC processor,
a module for scrambling and/or descrambling of data,
a module with a scrambler and/or descrambler,
a module with an FEC unit,
a module with a FIFO memory, and
a module with a unit for transmission and/or for reception of data, wherein the selected modules being integrated in particular on a common fixed substrate.

A system according to the invention, by means of which data bursts can be produced and/or processed comprises a first module and a second module, which is adjacent to the first module, and between which data is transmitted by means of a first transmission means in the first module and by means of a first reception means in the second module.

The first module furthermore contains second transmission means as well as third reception means, and the second module contains second reception means as well as third transmission means. One major idea of the invention is that the second transmission and reception means allow information to be interchanged relating to the validity of the data which is transmitted using the first transmission and reception means. The third transmission and reception means are used to transmit information to the first module from the second module, which information is used to determine whether the second module has received the valid data transmitted from the first module.

For example, the system according to the invention allows the modules to be connected to one another by hardware. In this case, the nature of the connection is preferably governed by software. The software defines the connections between the modules by setting registers, and is thus not itself involved in the data transport. This allows not only a high degree of flexibility in the choice of the processing path which the data passes through while passing through the modules, but also allows a high data processing rate, since the software is only indirectly involved in the transmission of the data between the modules.

A further advantage of the system according to the invention is the information interchange between the two adjacent modules. Since not only does the first module allow the second module to receive the information as to whether the data which is transmitted at the respective time is valid but the second module also allows the first module to receive the information as to whether the transmitted valid data has also been received, both modules always receive a status message or acknowledgement from the respective other module relating to the transmission that is currently being carried out. This avoids data losses. Times which the second module requires for processing the data can likewise be taken into account better by means of the invention. For example, it is possible to provide for further data transmissions to take place only when and as soon as the second module has signaled to the first module by means of the appropriate information transmission that it is ready for such further data transmissions.

The first module advantageously and additionally contains fourth transmission means, and the second module advantageously contains fourth reception means. The fourth transmission and reception means are used for transmission of information to the second module relating to possible completion of a data transmission. In particular, this information may relate to the completion of the transmission of a data packet. The described measure contributes to further improving the transmission reliability of the system according to the invention. A further advantage of this measure is that it allows particular handling of the end of a data packet. For example, in a module which contains a CRC unit (Cyclic Redundancy Check), a checksum is attached to the data packet or is removed from it. Furthermore, as a rule, the end of a data packet initiates an interrupt to an associated processor.

A clock transmitter unit which, for example, produces a clock signal at a clock rate of 26 MHz can advantageously be used for synchronization of the data and information interchange between the modules.

The clock signal may, for example, be a binary square-wave signal. It is advantageously possible to provide for the transmission of data and/or information to start and end with a change in the binary square-wave signal from a bit0 state to a bit1 state, or from a bit1 state to a bit0 state.

Furthermore, the transmitted data is advantageously digital data, and all the information that is interchanged has binary states, for example bit0 and bit1 states.

The statements so far have described only the situation in which the data transmission takes place from the first module to the second module. However, it is also possible to provide for data transmissions to take place between the first module and the second module in both directions. In this case, both modules must have the corresponding transmission and reception means for transmission of data and information.

The modules of the system according to the invention may, for example, be selected from modules as will be explained in the following text in the description relating to FIG. 1. In this case, it is particularly advantageous for all the modules of the system according to the invention to be integrated on a common fixed substrate. Since the system according to the invention is characterized by serial interfaces between the individual modules, the system according to the invention requires less space for integration on a common fixed substrate than previous systems of the same type.

One preferred application of the present system is offered by appliances by means of which data bursts are transmitted and received without the use of wires. Owing to the high degree of flexibility of the system according to the invention, protocols which are based on different standards, such as Bluetooth, DECT or HomeRF, can be implemented on it.

A further aspect of the invention relates to a method for data and information transmission within a system which corresponds to the system described above. In this case, data and information relating to the validity of the data are transmitted from the first module to the second module. In the opposite direction, the first module receives from the second module information relating to whether valid data has been received.

The method according to the invention has the advantage that each of the two modules transmits a message to the respective other module relating to the status of the present transmission or an acknowledgement relating to the present reception. Such a mutual interchange of information improves the reliability with regard to data losses. Furthermore, the modules can match data transmissions to the present processing state of the respective other module.

BRIEF DESCRIPTION OF THE DRAWINGS

The invention will be explained in more detail in the following text in an exemplary manner with reference to the drawings in which.

DETAILED DESCRIPTION OF THE PREFERRED EMBODIMENTS

Figure 1:
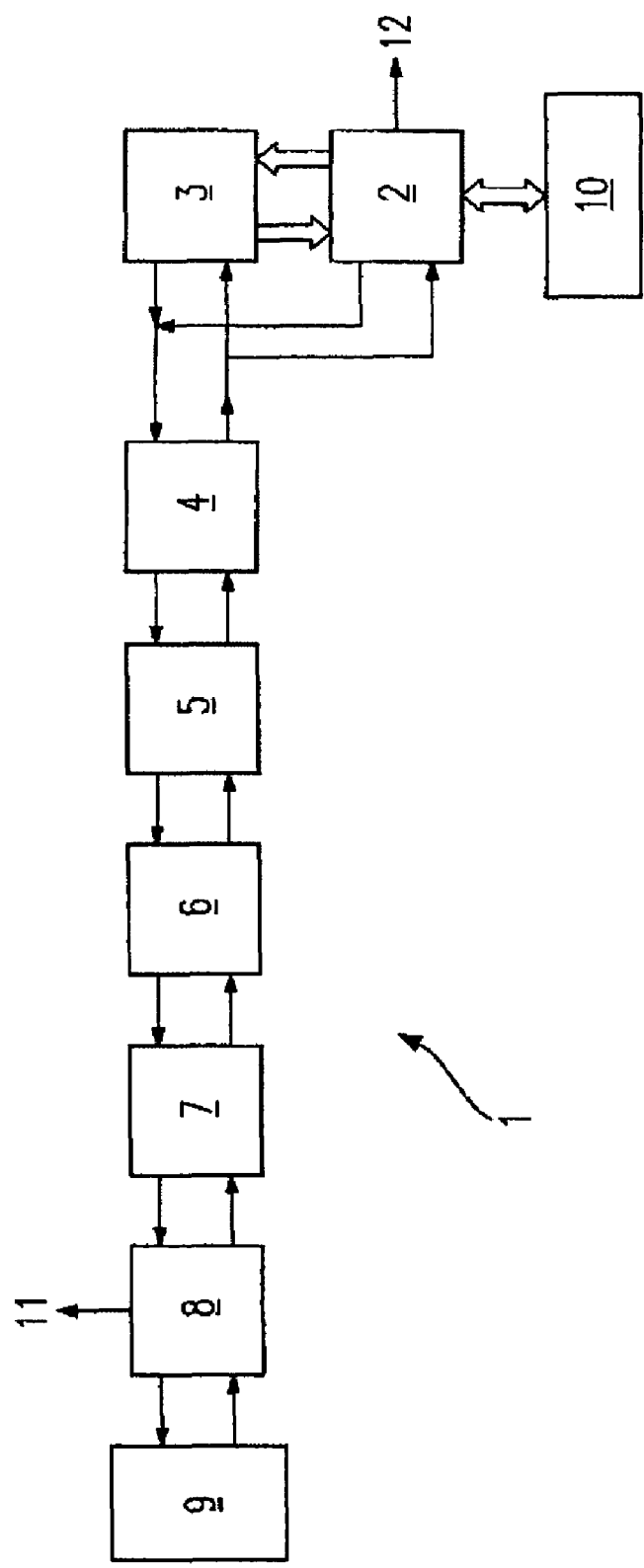
FIG. 1 shows a schematic illustration of one exemplary embodiment of the system according to the invention for production and/or processing of data bursts.

FIG. 1 shows a system 1 by means of which, on the one hand, it is possible to produce data bursts which are then transmitted to a receiver without the use of wires, and on the other hand it is possible to process data bursts which have already been received without the use of wires. For this purpose, the system 1 has series-connected modules 2 to 9, and data can be interchanged between adjacent modules. This is illustrated by the appropriate arrows in FIG. 1. In order to produce a data burst, the system 1 is passed through from the module 2 along the arrows to the module 9. In the opposite case, a data burst which has already been received can be processed by passing through the system 1 from the module 9 to the module 2. Each of the modules 3 to 7 may also selectively be deactivated, so that the relevant module is in this situation not involved in the production and/or processing of the data bursts.

When producing a data burst, the module 2, which contains a DMA unit (Direct Memory Access), obtains the data required for that data burst from a memory unit 10. After this, the data is transferred selectively either to the module 3 and then to the module 4, or directly to the module 4. The module 3 is a CVSD coder (Continuous Variable Slope Delta). During a CVSD coding process, analog speech signals are converted to a digital data stream. Instead of the CVSD coder, the module 3 may also contain different speech coders, such as an ADPCM unit (Adaptive Delta Pulse Code Modulator). The module 4 is a CRC generator (Cyclic Redundancy Check). The CRC generator, for example, adds to a data packet or data burst to be transmitted a monitoring bit pattern, on the basis of which transmission errors can be identified and possibly also corrected at the receiver end. The module 5 is used for scrambling of the data. The module 6 which is connected downstream from the module 5 contains a scrambler (Data Whitening), which scrambles digital data by converting it to a pseudo-random signal. The pseudo-random signal is descrambled again at the receiver end by means of an appropriate code. The module 7 provides a further measure for error identification and error correction by means of an FEC method (Forward Error Correction). The data is then passed to the module 8, which contains a FIFO memory (First in-First out). Each of the modules 4 to 7 may also be deactivated. The data passes through a deactivated module without said deactivated module processing the data in the predetermined manner. This procedure is necessary in order to make it possible to generate the various parts of a data packet, such as the access code, the data packet header and the payload data part. As soon as a complete data packet has been temporarily stored in the module 8, the module 8 reports this fact to an associated processor by means of an interrupt 11. This causes the processor to pass the data packet that is located in the module 8 to the module 9, from where it is transmitted to an associated receiver. During this process, the processor also configures the modules 3 to 7 for production of the next data packet.

On reception of a data packet or data burst, the sequence of the modules 2 to 9 is passed through in the opposite sequence to the sequence described above. During this process, the modules 3 to 7 each carry out a function which is the inverse of the function described for them above. For example, the module 5 is now used for descrambling the data from received data packets instead of for scrambling the data to be transmitted, as described above. After the processing of the received data, the processed data packet is temporarily stored in the memory unit 10. As soon as the last bit of the processed data packet has been temporarily stored, the DMA unit in the module 2 produces an interrupt 12, in response to which the processing of the next data packet waiting in the FIFO memory in the module 8 is started.

Figure 2:
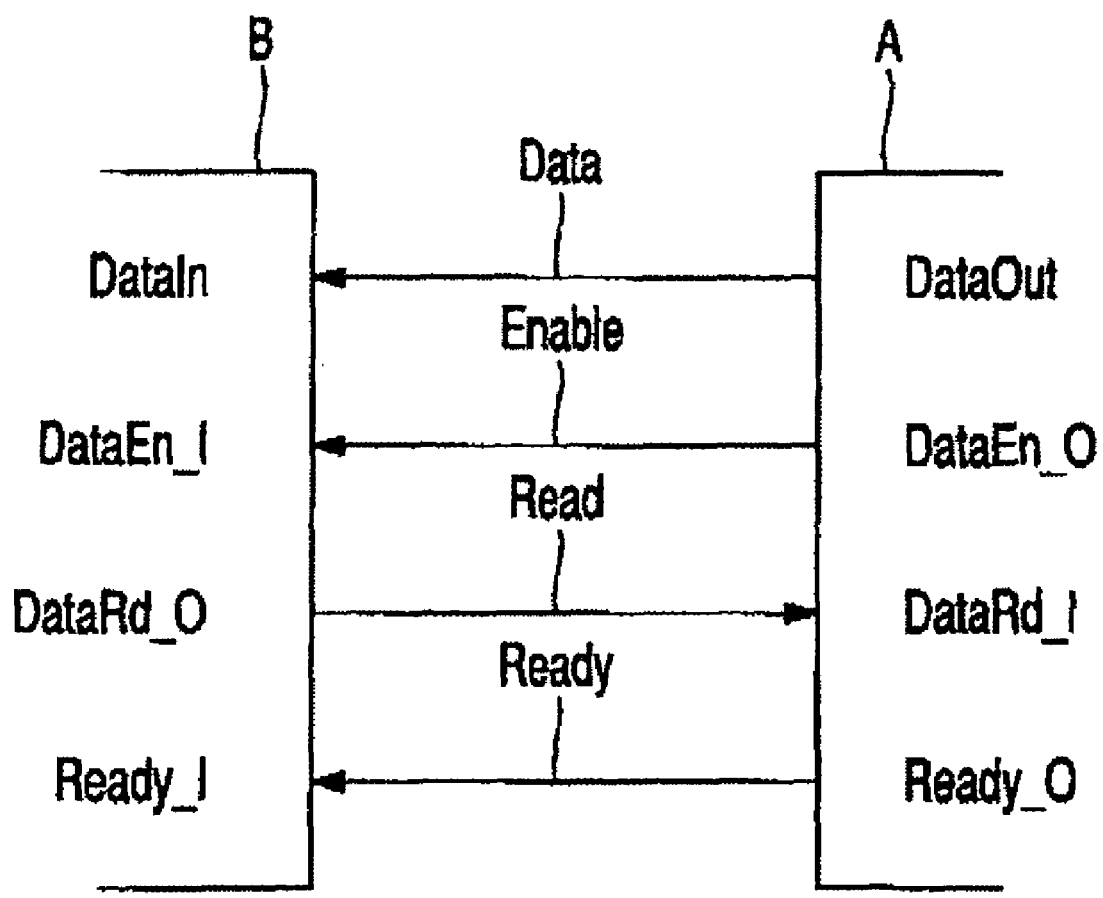
FIG. 2 shows a schematic illustration of an interface between two adjacent modules of one exemplary embodiment of the system according to the invention.

FIG. 2 shows, schematically, an interface between a module A and a module B, which is adjacent to it, in one exemplary embodiment of the system according to the invention. The modules A and B may, for example, be two of the modules 2 to 9 shown in FIG. 1. Digital data Data is transmitted from an output DataOut of the module A to an input DataIn of the module B. If the transmitted data Data is valid, the module A reports this to the module B by means of information Enable. For this purpose, the module A has an output DataEn_O and the module B has an input DataEn_I. If valid data Data has been received successfully by the module B, the module B signals this fact to the module A by means of information Read, which is transmitted between an output DataRd_O of the module B and an input DataRd_I of the module A. Once the last valid bit in a data packet has been transmitted from the module A to the module B and this bit has been read by the module B, information Ready which is transmitted from the module A is used to signal to the module B that the data transmission has ended temporarily. The time interval before the next data transmission is required in order to generate a new data packet.

Figure 3A:
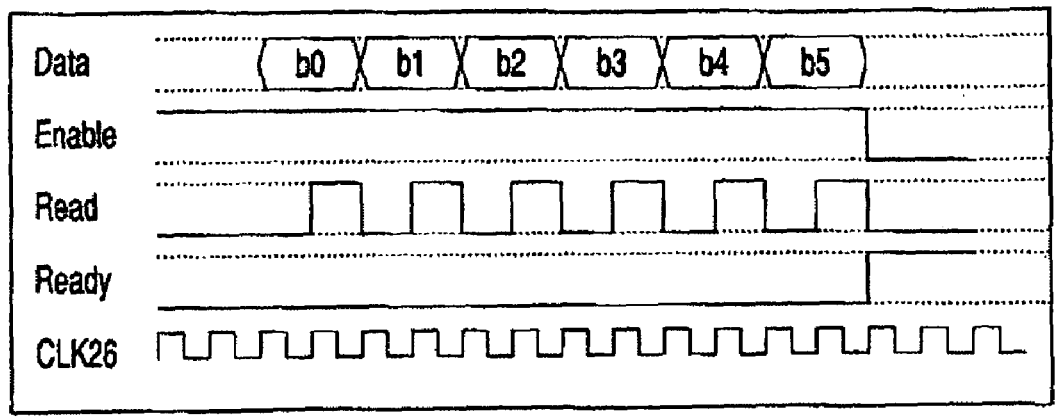
FIGS. 3A-C show schematic diagrams relating to the transmission of data and information between two adjacent modules of one exemplary embodiment of the system according to the invention.
Figure 3B:
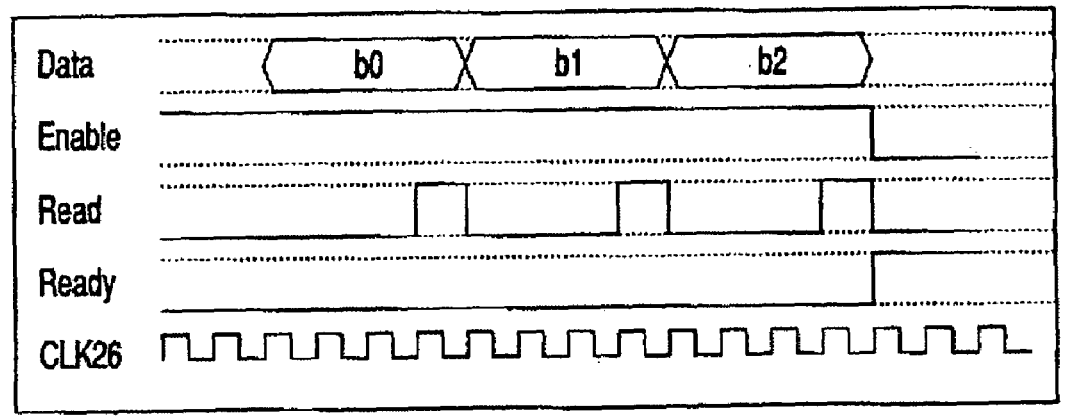
Figure 3C:
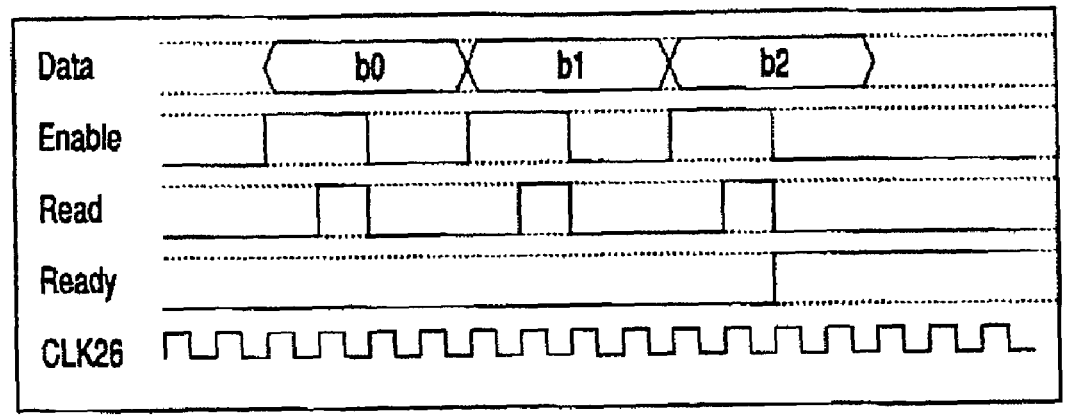

FIGS. 3A, 3B and 3C show, schematically, various data and information transmissions between the modules A and B. The transmitted data Data is bit strings which are composed of bits bi (i=1, 2, 3, . . . ). The information Enable, Read and Ready which is interchanged between the modules A and B either has a bit0 state or a bit1 state. The system according to the invention is preferably connected to a clock transmitter unit which, for example as in the present exemplary embodiment, produces a square-wave clock signal CLK26 at a frequency of 26 MHz, which may likewise assume a bit0 state or a bit1 state. The information Enable, Read and Ready which can be output at the respective outputs of the modules A and B changes its state only on a rising flank of the clock signal CLK26. The information Enable, Read and Ready which is received at the inputs of the modules A and B is likewise read only on a rising flank of the clock signal CLK26.

FIGS. 3A to 3C show that the information Enable is output for valid transmission of the data Data from the module A in a bit1 state. If the module B has not only read a bit bi of the data Data but has also received the information Enable in the bit1 state, the module B signals to the module A the reception of a valid bit bi, by transmitting a short pulse in the bit1 state as the information Read.

During transmission of valid bits bi, the module A leaves the information Enable in the bit1 state provided that it can transmit new valid data Data within the next cycle of the clock signal CLK26. However, as soon as invalid data or no data has been transmitted, the information Enable is set to the bit0 state. For example, FIG. 3C shows the situation after the bit b0 has been read by the module B during a bit1 state of the information Enable, and the information Enable has been reset to the bit0 state again by the module A. This signals to the module B that no valid data Data will be transmitted within the next cycle of the clock signal CLK26.

Once the last valid bit b1 of a data packet which, for example in FIG. 3A, contains the bits b0 to b5 has been transmitted and has been read by the module B, the information Ready is set to the bit1 state. This signals to the module B that the data transmission has been interrupted or ended temporarily.

FIG. 3A shows the maximum data transmission rate for the present exemplary embodiment. A 26 MHz clock signal allows one bit bi to be transmitted within two cycles of the clock signal CLK26. This corresponds to a data transmission rate of 13 Mbit/s.

The bidirectional transmission of the information Enable, Read and Ready between the modules A and B ensures that the module B is always informed of the state of the data transmission, and that the module A always receives an acknowledgement as to whether a transmission step was successful.

We claim:

1. A method for transmission of transmission or received data between two adjacent, series-connected modules in a transmission/reception path of a device for production and processing of data bursts, which is contained in a device for transmission and reception of data without the use of wires, the method comprising the steps of:
    when transmission data is being transmitted without the use of wires, the two modules are a part of the transmission path, and transmission data is transmitted from a first of the two modules to a second of the two modules, information relating to the validity of the transmission data is transmitted from the first module to the second module, and information relating to the reception of valid transmission data is transmitted from the second module to the first module, and
    when received data is received without the use of wires, the two modules are a part of the reception path, and received data is transmitted from the second module to the first module, information relating to the validity of the received data is transmitted from the second module to the first module, and information relating to the reception of valid received data is transmitted from the first module to the second module.

2. The method as claimed in claim 1, wherein
information relating to the completion of a data transmission, in particular relating to the completion of the transmission of a data packet, is transmitted from the first module to the second module during transmission, and is transmitted from the second module to the first module during reception.

3. The method as claimed in claim 1, wherein
the first module and the second module are connected to one another by means of hard wiring, in which connections for data and information transmission between the first module and the second module are defined by software which, for this purpose, in particular sets registers.

4. The method as claimed in claim 1, wherein
a clock transmitter unit produces a clock signal which, in particular, is at a clock rate of 26 MHz.

5. The method as claimed in claim 4, wherein
the transmission of data starts and ends with the clock signal from the clock transmitter unit.

6. The method as claimed in claim 4, wherein
the clock signal is a binary square-wave signal.

7. The method as claimed in claim 6, wherein
the transmission of data starts and ends with a change in the binary square-wave signal from a bit0 state to a bit1 state, or from a bit1 state to a bit0 state.

8. The method as claimed in claim 1, wherein
the data comprises bit strings.

9. The method as claimed in claim 1, wherein
at least one of the information relating to the validity of the data, the information relating to the reception of valid data, and the information relating to the completion of a data transmission has binary states.

10. The method as claimed in claim 9, wherein
during the transmission of valid data, the information relating to the validity of the data is transmitted in a bit1 state or in a bit0 state.

11. The method as claimed in claim 10, wherein
when one of the modules receives data and when the module receives information relating to the validity of the data in a high state, a pulse is transmitted in a bit1 state or in a bit0 state as information relating to the reception of valid data from the module.

12. The method as claimed in claim 9, wherein
after the completion of the transmission of data by one of the modules and after the valid reception of the data by the respective module other than the transmitting module, the information relating to the completion of a data transmission is sent in a bit1 state or in a bit0 state.

13. The method as claimed in claim 1, wherein
the at least two series-connected modules can be selected from the totality of a list of modules which comprises the following modules:
    a module for access to a memory unit,
    a module with a CVSD coder and/or CVSD decoder,
    a module with an ADPCM unit,
    a module with a CRC generator and/or a CRC processor,
    a module for scrambling and/or descrambling of data,
    a module with a scrambler and/or descrambler,
    a module with an FEC unit,
    a module with a FIFO memory, and
    a module with a unit for transmission and/or for reception of data, with
the selected modules being integrated in particular on a common fixed substrate.

14. The method as claimed in claim 4, wherein
the transmission of information starts and ends with the clock signal from the clock transmitter unit.

15. The method as claimed in claim 6, wherein
the transmission of information starts and ends with a change in the binary square-wave signal from a bit0 state to a bit1 state, or from a bit1 state to a bit0 state.

* * * * *